(12) United States Patent
Klocke

(10) Patent No.: US 8,857,376 B2
(45) Date of Patent: Oct. 14, 2014

(54) HOG CONFINEMENT BUILDING VENTILATION SYSTEM

(71) Applicant: Dave Klocke, Templeton, IA (US)

(72) Inventor: Dave Klocke, Templeton, IA (US)

( * ) Notice: Subject to any disclaimer, the term of this patent is extended or adjusted under 35 U.S.C. 154(b) by 0 days.

(21) Appl. No.: 13/644,364

(22) Filed: Oct. 4, 2012

(65) Prior Publication Data

US 2014/0096719 A1    Apr. 10, 2014

(51) Int. Cl.
     *A01K 1/00*      (2006.01)

(52) U.S. Cl.
     CPC .................................. *A01K 1/0047* (2013.01)
     USPC .......................................... 119/448; 119/500

(58) Field of Classification Search
     CPC ..... A01K 1/0151; A01K 1/00; A01K 1/0047; A01K 1/01; A01K 31/04; A01K 31/22; A01K 1/0064; F24F 7/00
     USPC ......... 119/448, 436, 437, 442, 444, 445, 447, 119/450, 479, 493, 487, 500, 529, 527
     See application file for complete search history.

(56) References Cited

U.S. PATENT DOCUMENTS

| | | | |
|---|---|---|---|
| 1,615,964 A * | 2/1927 | Straight | 454/250 |
| 3,677,229 A * | 7/1972 | Blough et al. | 119/448 |
| 3,951,336 A * | 4/1976 | Miller et al. | 454/238 |
| 4,241,871 A | 12/1980 | Newell, III et al. | |
| 4,292,927 A | 10/1981 | Sassmann | |
| 4,829,885 A | 5/1989 | McVicker | |
| 5,036,797 A | 8/1991 | Koozer | |
| 5,136,980 A | 8/1992 | Schoeber et al. | |
| 5,666,905 A | 9/1997 | Mackin et al. | |
| 5,738,713 A | 4/1998 | Firth | |
| 5,890,454 A | 4/1999 | Moore, Jr. | |
| 5,911,195 A | 6/1999 | Tripp et al. | |
| 5,983,834 A * | 11/1999 | Tai | 119/448 |
| 6,059,865 A | 5/2000 | Poteat | |
| 6,156,268 A | 12/2000 | Curry et al. | |
| 6,182,610 B1 | 2/2001 | Tripp et al. | |

(Continued)

FOREIGN PATENT DOCUMENTS

| | | |
|---|---|---|
| CN | 2625466 Y | 7/2004 |
| CN | 1563617 A | 1/2005 |

(Continued)

OTHER PUBLICATIONS

CN 1563617 A, Ji Zhongyi—English Translation.

(Continued)

*Primary Examiner* — Trinh Nguyen

(74) *Attorney, Agent, or Firm* — McKee, Voorhees & Sease

(57) ABSTRACT

A ventilation system is provided for a hog confinement building having a slatted floor, a manure reservoir beneath the floor, and a pump out pit in communication with the reservoir. The ventilation system includes a fan on top of the pump out pit, with an air conduit extending downwardly from the fan. A gate is slidably mounted on the conduit, with a float on the bottom end of the gate. The float sits on the surface of the manure, such that the gate rises and falls with changes in the manure level. A ventilation opening on the lower end of the gate allows air to be drawn from the manure reservoir adjacent the surface of the manure, upwardly through the conduit for expulsion by the fan. Air turbulence beneath the slatted floor is minimized to reduce or eliminate rising noxious gases through the slatted floor.

28 Claims, 10 Drawing Sheets

(56) References Cited

U.S. PATENT DOCUMENTS

| | | |
|---|---|---|
| 6,254,776 B1 | 7/2001 | Seagle |
| 6,276,304 B1 * | 8/2001 | Tai ................................ 119/448 |
| 6,321,687 B1 * | 11/2001 | Lemmon et al. ............. 119/448 |
| 6,385,968 B1 | 5/2002 | Gustafsson et al. |
| 6,810,832 B2 | 11/2004 | Ford |
| 8,182,593 B2 | 5/2012 | Rapp |
| 8,635,974 B2 * | 1/2014 | Lemmon et al. ............. 119/448 |
| 2002/0007801 A1 * | 1/2002 | Lemmon et al. ............. 119/450 |
| 2002/0100427 A1 * | 8/2002 | Notenbomer ................ 119/447 |
| 2006/0086651 A1 | 4/2006 | Sower |
| 2009/0301402 A1 * | 12/2009 | Devine et al. ............... 119/447 |
| 2010/0012040 A1 * | 1/2010 | Pow et al. .................. 119/14.03 |
| 2011/0146582 A1 * | 6/2011 | Lemmon et al. ............. 119/448 |
| 2012/0148387 A1 | 6/2012 | Labrecque |
| 2012/0149293 A1 | 6/2012 | Labrecque |
| 2012/0149294 A1 | 6/2012 | Labrecque |

FOREIGN PATENT DOCUMENTS

| | | |
|---|---|---|
| CN | 202179020 U | 4/2012 |
| DE | 10 2010 050 354 A1 | 5/2012 |
| EP | 1 277 508 A2 | 1/2003 |
| EP | 2 181 583 B1 | 7/2012 |
| JP | 410150877 A * | 6/1998 |
| JP | 02002126054 A * | 5/2002 |

OTHER PUBLICATIONS

CN 2625466 Y, Yang Peng—English Translation.
CN 202179020 U—English Translation.
DE10 2010 050 354 A1, Landbau Ingenieurburo Ernst Schwarz & Partner—English Translation.
EP 1 277 508 A2, Grote Herr Klaus—English Translation.
EP 2 181 583 B1, Krause Karl-Heinz—English Translation.

* cited by examiner

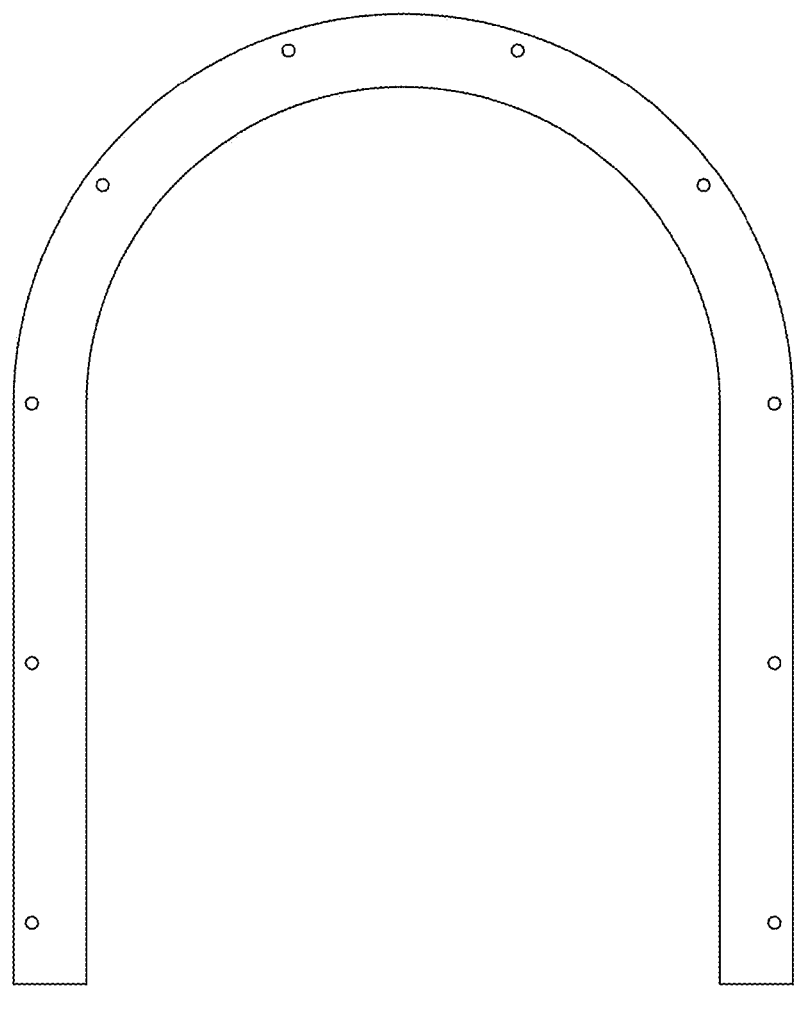
Fig. 7

HOG CONFINEMENT BUILDING VENTILATION SYSTEM

FIELD OF THE INVENTION

The present invention generally relates to hog confinement buildings, and particularly to an improved ventilation system which provides an enhanced air quality within the building. The present invention pulls air from the manure pit at a level adjacent the surface of the manure so as to eliminate or minimize air turbulence and return of noxious gases from the manure pit through the slatted floor to the hog confinement area.

BACKGROUND OF THE INVENTION

Hog confinement buildings typically house hundreds of animals which produce a substantial volume of urine and manure waste. The urine and manure waste material in the reservoir produces noxious gases, including hydrogen sulfide, ammonia, and methane. Methane is highly flammable. The buildings normally have a slatted floor through which these waste materials fall into a pit or reservoir, and must periodically be removed before the pit fills to capacity. Some hog confinement buildings include pump out pits spaced along the foundation wall and communicating through spaced openings in the foundation wall with the interior manure pit. Pumps can be provided or lowered into the pits to remove manure and keep the level of manure in the primary pit at a desired level.

During pit pumping, agitation of the waste material releases hydrogen sulfide, which may kill the pigs if concentration levels rise too high. Fans are provided for the confinement building and/or on the pump out pits to expel air. However, these fans typically pull air from an area immediately below the slatted floor of the building which may create turbulence and cause noxious gases and fumes to rise upwardly through the slatted floor, which is unhealthy and potentially deadly to the pigs in the confinement building. Also, pumping sometimes creates pit foaming, which causes methane bubbles to be released, which further contaminates the building air.

Some farmers tend to over ventilate their barns. In the winter, excess air removal and replacement with fresh outside air requires more heating, which necessarily requires more costs to the farmer. In the summer, excess air removal and replacement with fresh, hot outside air requires more cooling, and thus more costs to the farmer.

Therefore, a primary objective of the present invention is a provision of an improved ventilation system for hog confinement buildings which avoids the problems of the prior art.

Another objective of the present invention is the provision of a ventilation system for hog confinement buildings which provides an air conduit for expulsion of non-fresh air by ventilation fans.

A further objective of the present invention is the provision of an improved ventilation system for hog confinement buildings which removes the lowest quality air from the manure pit.

Still another objective of the present invention is the provision of an improved ventilation system for hog confinement buildings which expels noxious gases with a minimum of turbulence.

Yet another objective of the present invention is the provision of an improved ventilation system for a hog confinement building having a sliding gate which floats on the manure surface to allow air to be pulled from adjacent the manure surface for expulsion by a fan.

Still another objective of the present invention is the provision of an improved ventilation system for hog confinement buildings which can be utilized with pump out pit fans, roof mounted fans, or other conventional ventilation fans.

Another objective of the present invention is the provision of an improved ventilation system for hog confinement buildings which can be retrofit to existing buildings or installed as original equipment.

A further objective of the present invention is the provision of an improved ventilation system for hog confinement buildings which is economical to manufacture and which is safe and durable in use.

These and other objectives will become apparent from the following description of the invention.

SUMMARY OF THE INVENTION

The hog confinement building ventilation system of the present invention includes, in a retrofit embodiment, a conduit extending downwardly in the pump out pit from the fan to an area at or near the bottom of the pit. A sliding gate is mounted on the conduit and floats on the surface of the manure or waste material in the pump out pit. An air opening or vents are provided in the lower most portion of the gate so that the fan draws air, including noxious gases, adjacent the surface of the manure for expulsion by the fan.

In an alternative embodiment for original installation in a new hog confinement building, a pair of tracks or channels are mounted in the pump out pit or opposite sides of the manure opening in the exterior foundation wall, with the floating gate slidably mounted in the tracks. The air holes or vents in the bottom of the gate allow the fan to pull air from immediately adjacent the surface of the manure or waste material in the pit for expulsion.

In both embodiments, air turbulence adjacent the slatted floor of the confinement building is minimized, since the expelled air is pulled from a distance spaced downwardly from the slatted floor adjacent the manure surface. Thus, a rise of noxious gases from the manure pit through the slatted floor is eliminated or minimized.

BRIEF DESCRIPTION OF THE DRAWINGS

FIG. 7 is an exploded top view of the conduit and track assembly of the ventilation system shown in FIG. 4.

DETAILED DESCRIPTION OF THE PREFERRED EMBODIMENTS

Figure 1:
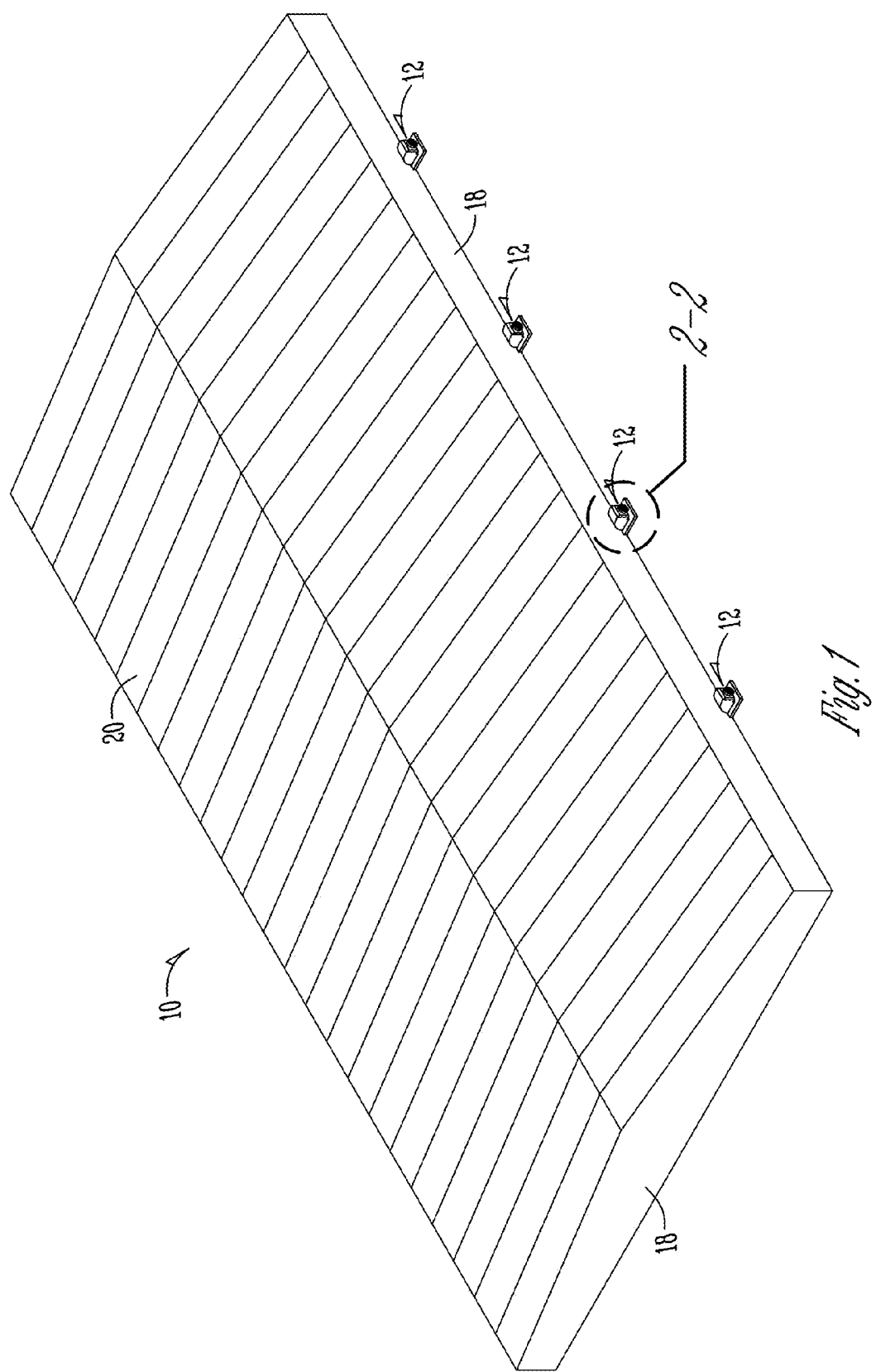
FIG. 1 is a perspective view of a hog confinement building having pump out pits spaced along the exterior wall of the building.
Figure 2:
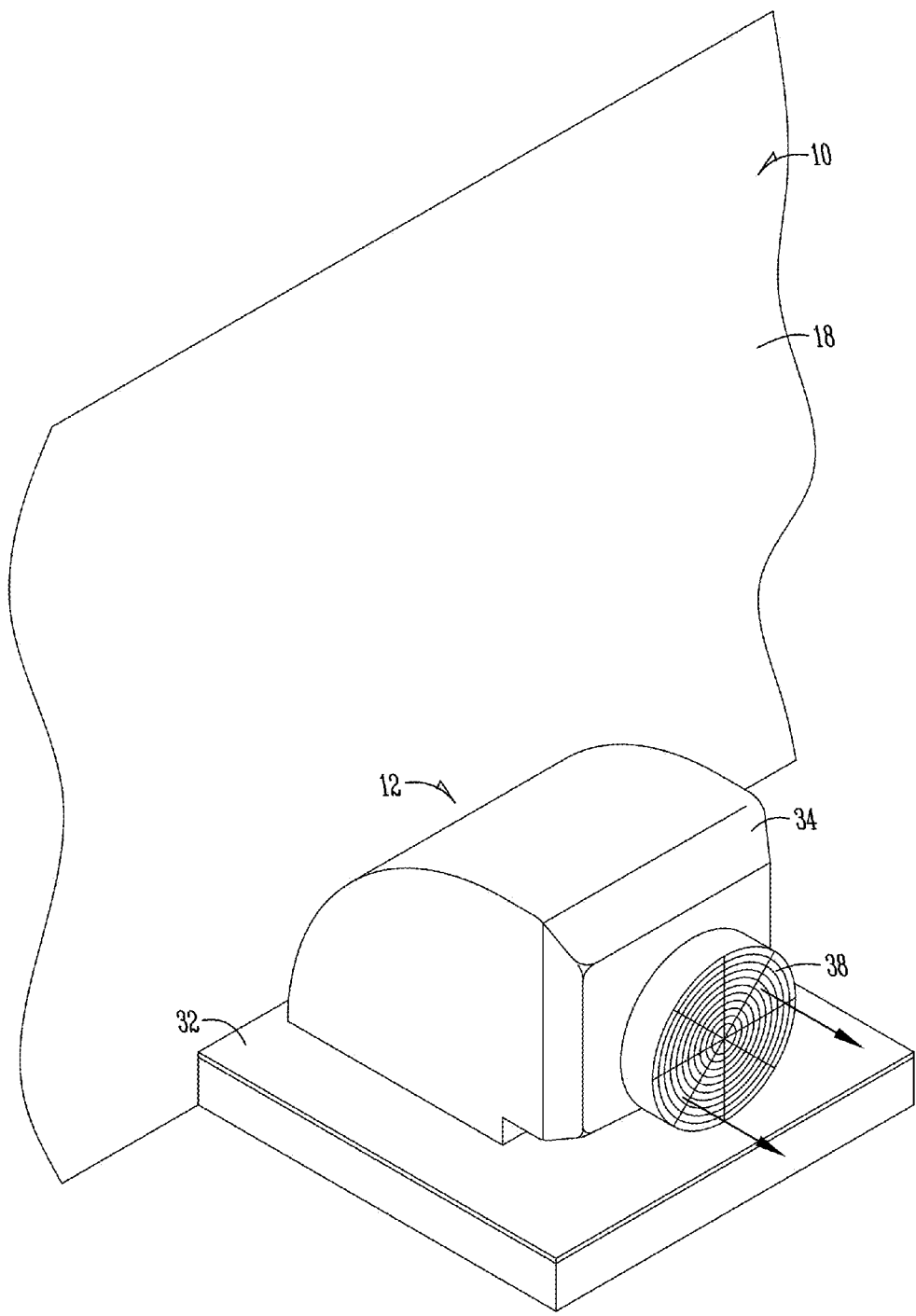
FIG. 2 is an enlarged view of one of the pump out pits of the hog confinement building.
Figure 3:
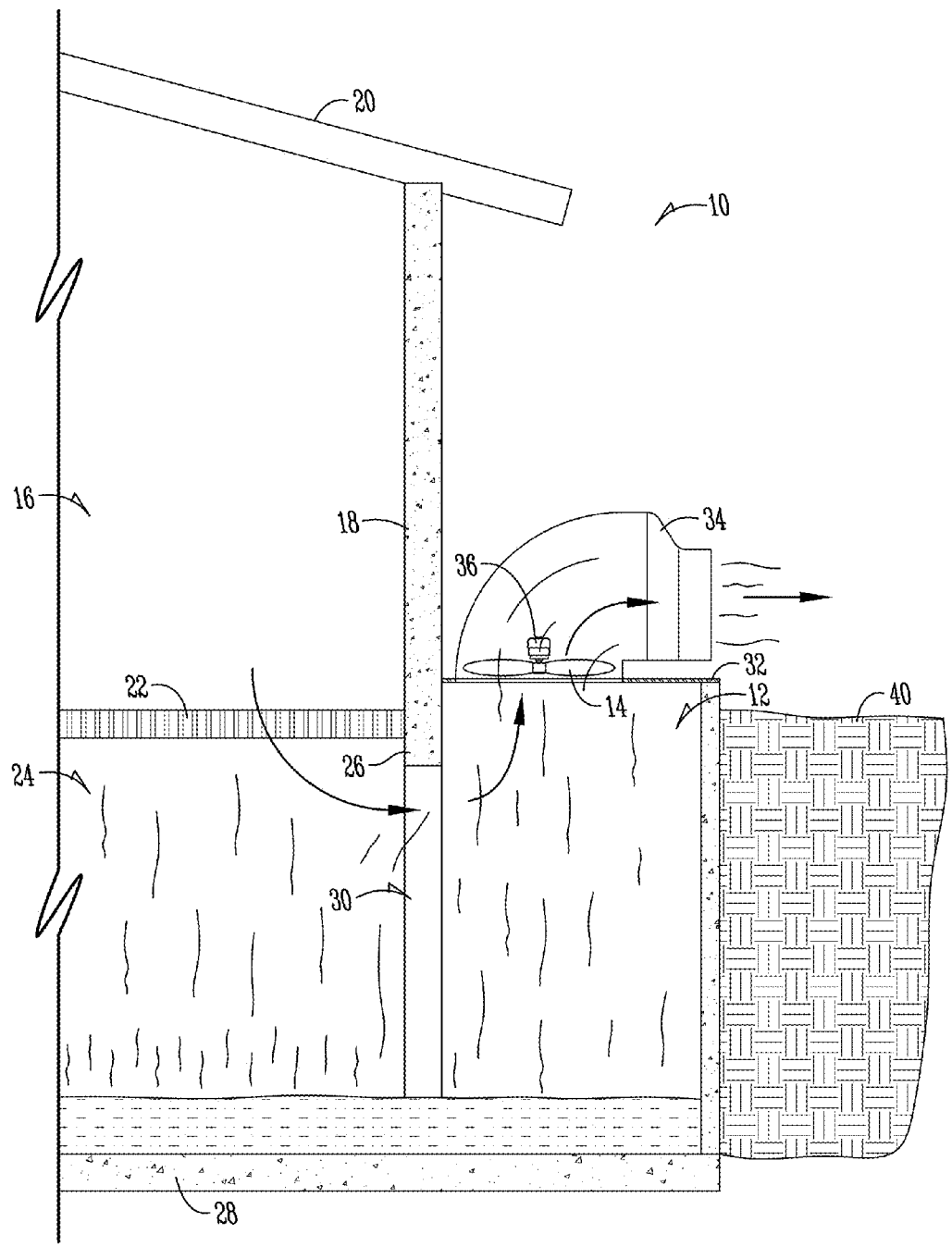
FIG. 3 is a sectional view of a hog confinement building having a conventional pump out pit fan, as is known in the prior art.
Figure 4:
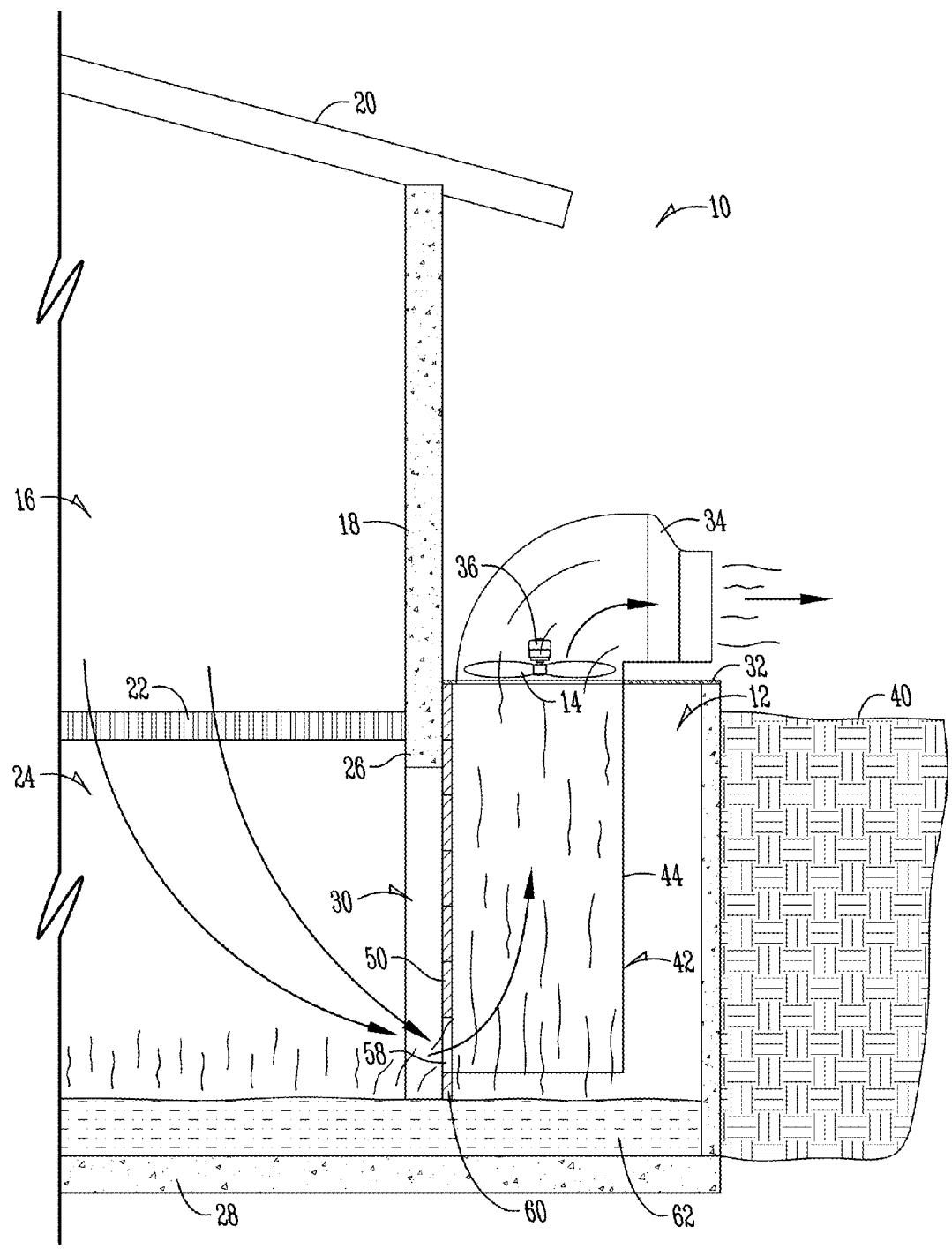
FIG. 4 is a sectional view showing a hog confinement building with a first embodiment of the ventilation system of the present invention mounted in the pump out pit.

FIG. 1 shows the basic structure of a hog confinement building 10 having a series of pump out pits 12 spaced along opposite sides of the building 10. A fan 14 is mounted on the top of each pump out pit 12 as best seen in FIG. 2. As shown in FIGS. 3 and 4, the building 10 includes a hog confinement area 16 defined by perimeter walls 18, a roof 20, and a slatted floor 22. A waste material or manure pit or reservoir 24 is provided beneath the slatted floor 22, as defined by the foundation walls 26 and the reservoir floor 28. Each pump out pit 12 is formed adjacent the foundation walls 26, with an opening 30 being formed in the foundation wall 26 to provide flow of waste material from the manure reservoir 24 into the pump out pit 12. As seen in FIGS. 2-4, a cover 32 is provided on the top of each pit 12. A fan housing 34 is mounted on each cover 32 and encloses the fan 14 and fan motor 36. The housing 34 includes an exhaust opening covered by a grate or screen 38. Thus, as seen in FIGS. 3 and 4, the manure reservoir 24 and pump out pit 12 both resides substantially beneath the surface of the ground 40.

The above description of the building 10 is conventional, and does not constitute a part of the present invention.

Figure 5:
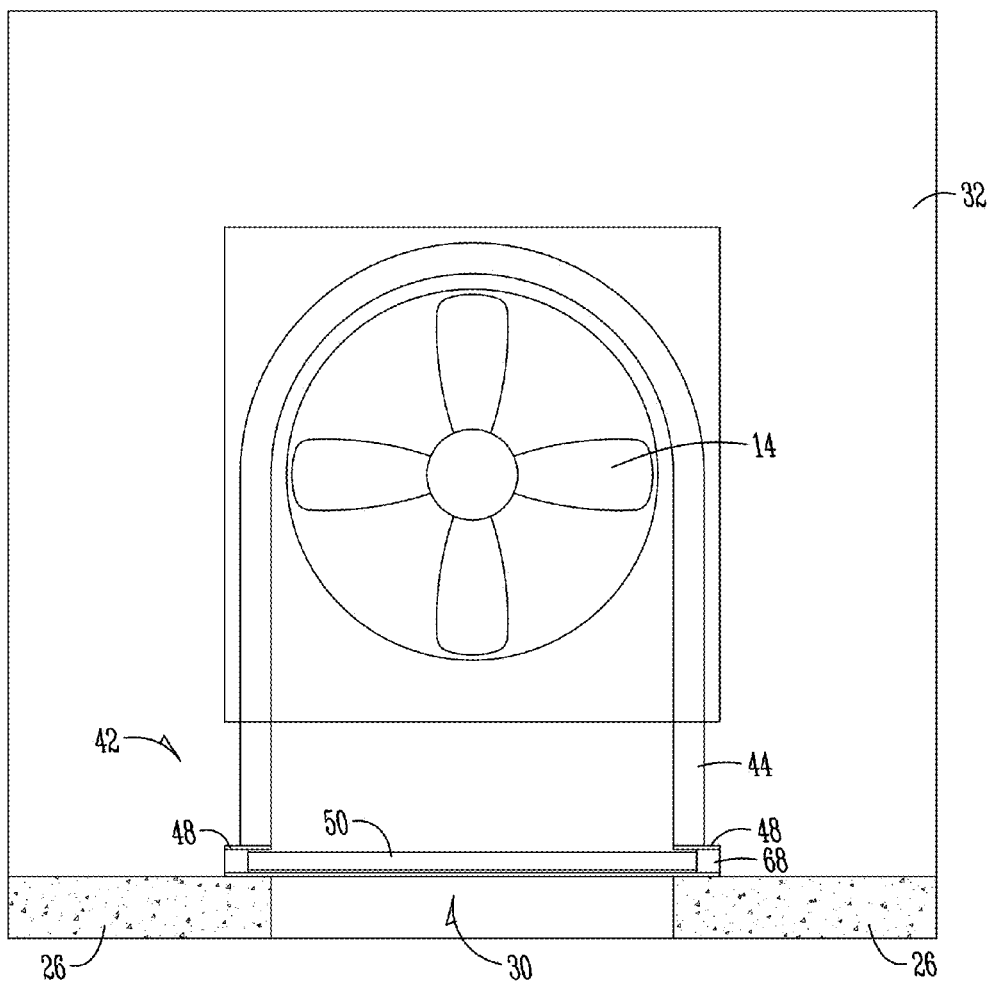
FIG. 5 is a top plan view showing the ventilation system of FIG. 4.

FIGS. 4-8 show a retrofit embodiment of the ventilation system 42 of the present invention, which can be installed in an existing pump out pit 12 of the confinement building 10. The ventilation system 42 includes an air conduit 44 which extends downwardly from the fan housing 34. The bottom of the conduit 44 may sit upon the reservoir floor 28 or be spaced above the floor 28, as seen in FIG. 4. As seen in FIGS. 5 and 7, the conduit 44 may be in the form of a U-shaped elongated body 46, though other shapes may also be used. The open side of the body 46 includes spaced apart tracks 48 which slidably receive a gate or panel 50.

Figure 6:
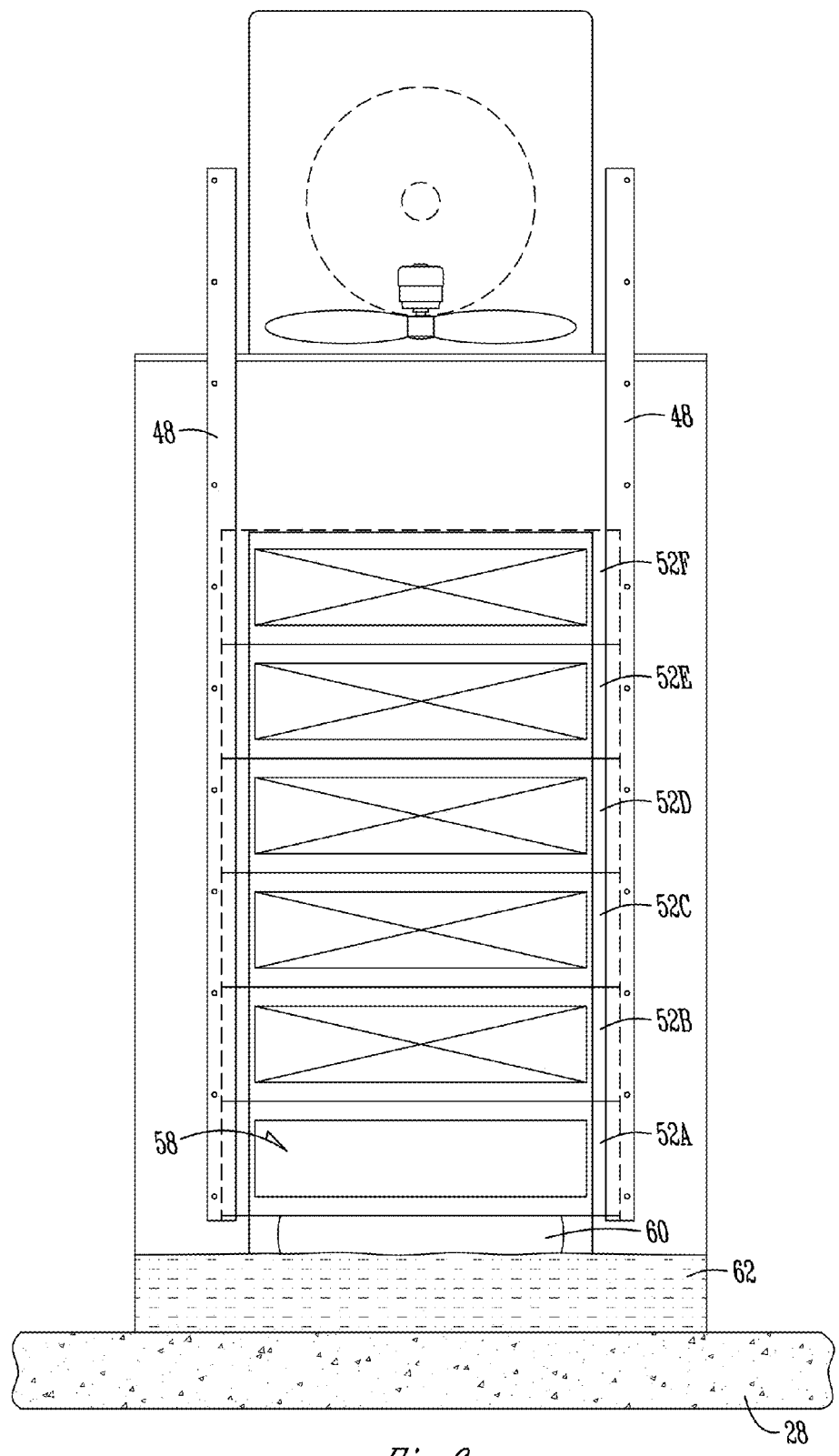
FIG. 6 is a side elevation view showing the ventilation system of FIG. 4.
Figure 8:
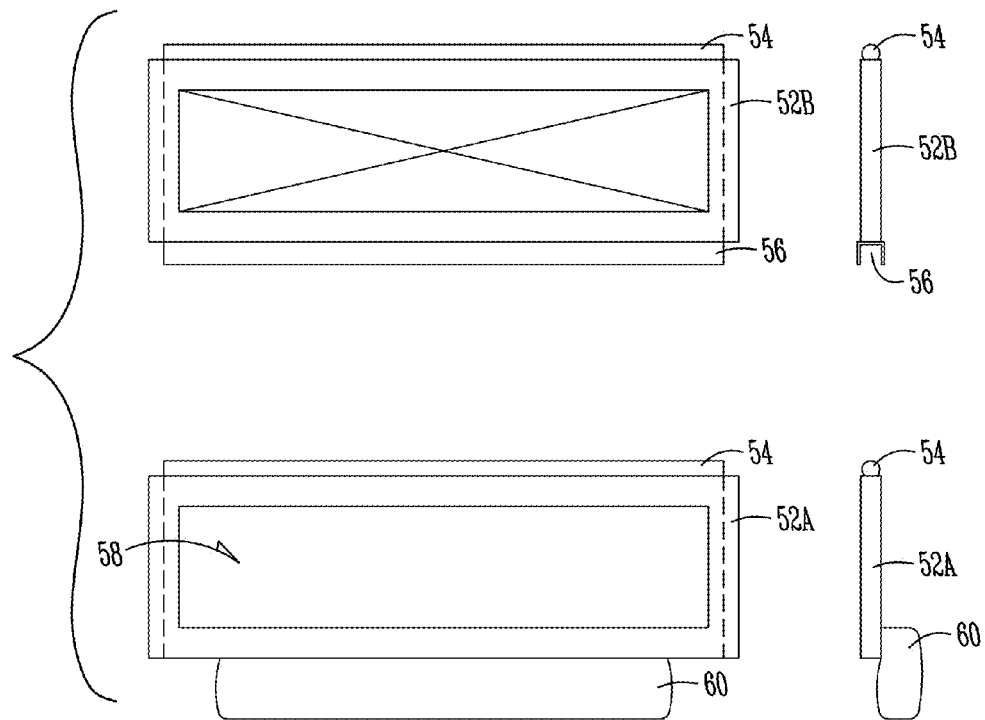
FIG. 8 is an exploded view of two segments of the floating gate of the ventilation system of the present invention.
Figure 9:
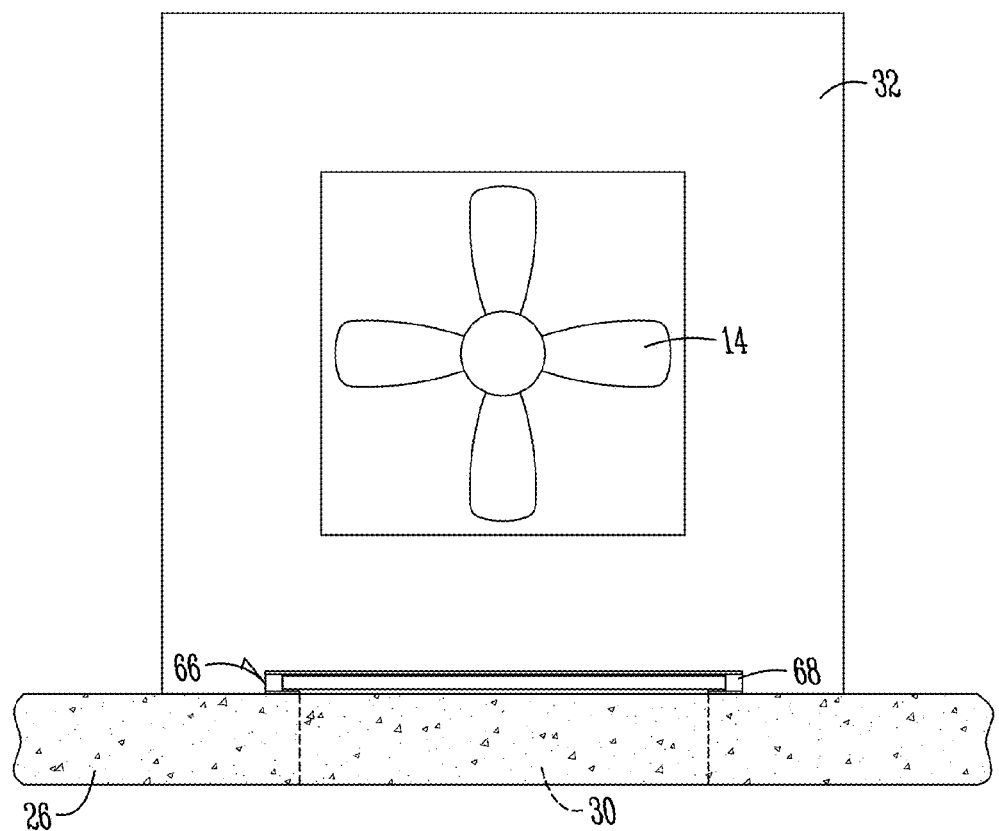
FIG. 9 is a top plan view showing a second embodiment of an improved ventilation system mounted in a pump out pit, according to the present invention.

The gate 50 may be formed with a one-piece construction, or alternative, as shown in FIG. 6, the gate 50 may include multiple segments 52A-F which can be removably connected in any convenient manner, such as a tongue and groove assembly. As seen in FIG. 8, one gate segment 52 has an upper tongue 54 which can be received in a lower groove 56 on the adjacent gate segment. The gate 50 or gate segments 52B-F are solid so as to preclude airflow, except through an opening 58 at the lower end of the gate 50 or in gate segment 52A.

The bottom of the gate 50 includes a float 60 which floats upon the top of the manure 62, as shown in FIGS. 4 and 6. Since the gate 50 floats upon the manure 62, the gate opening 58 is maintained at an elevation adjacent the surface of the manure. Accordingly, the fan 14 draws noxious gas from the manure reservoir 24 near the surface of the manure 62, and spaced downwardly from the slatted floor 22, thereby minimizing air turbulence and rising gases through the slatted floor 22, as shown by the arrows in FIG. 4. As the depth of the manure 62 in the reservoir 24 increases, the gate 50 floats upwardly so that the gate opening 58 is maintained at an elevation adjacent or close to the manure surface. The solid gate segments 52B-F prevent air from being drawn into the conduit 44 from an area immediately below the slatted floor 22. In comparison, air flows downwardly from the confinement building 10, through the slatted floor, and through the upper end of the opening 30 adjacent the slatted floor for expulsion by the fan 14, as shown by the arrows in FIG. 3.

The conduit 44 with the U-shaped body 46 is preferably a retrofit installation into an existing pump out pit 12. For a new hog confinement building 10, an alternative embodiment of the ventilation system 64 can be utilized. The system 64 utilizes a pair of channels 66 spaced on opposite sides of the opening 30 in the foundation walls 26. The gate 50 with the opening 58 and the float 60 is slidably received in the channels 66 so as to substantially close the opening 30 in the foundation wall. The gate 50 floats on the surface of the manure 62 and allows air to be pulled through the lower opening 58 by the fan 14.

In both systems 42 and 64, the pit cover 32 includes a slot 68 through which the gate 50 extends as the gate 50 arises with increasing manure levels. Preferably, one of the ventilation systems 42 are installed in each pump out pit 12.

Figure 10:
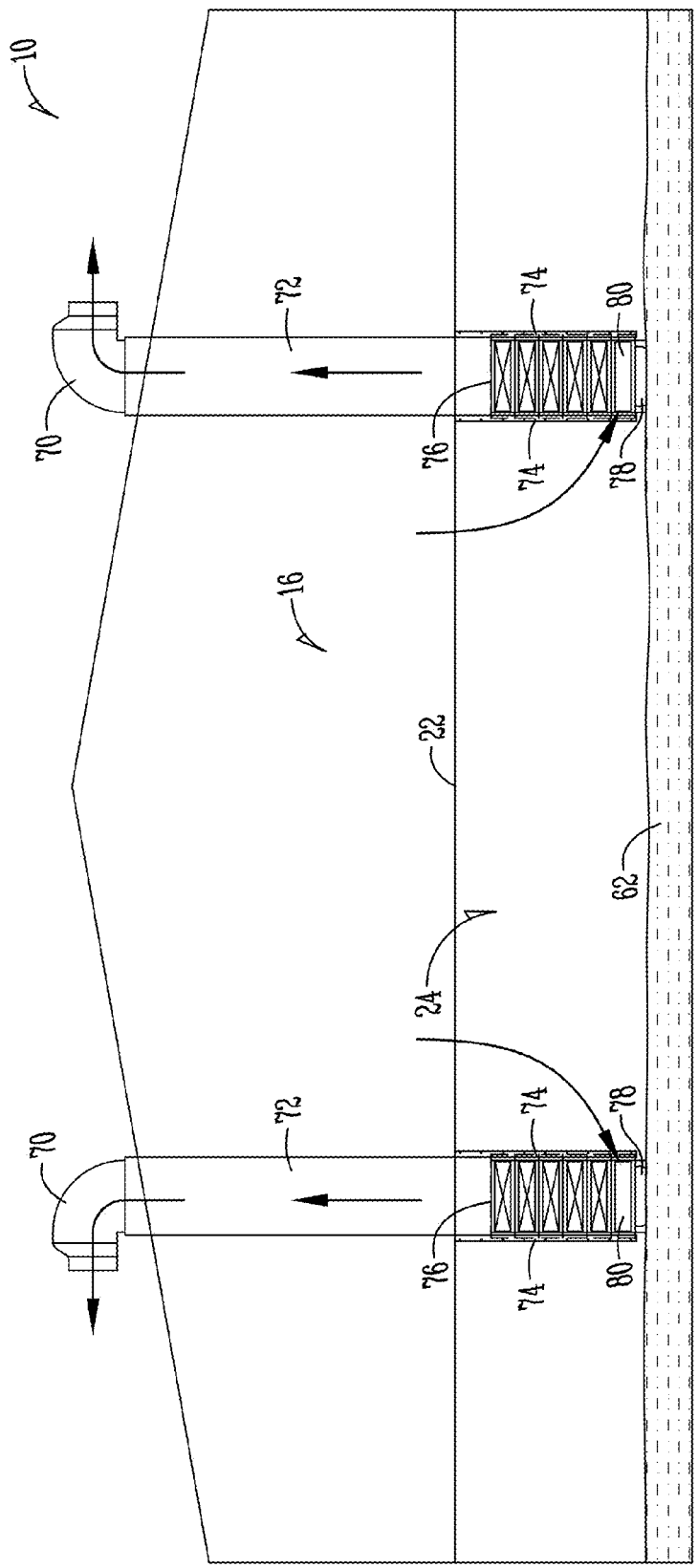
FIG. 10 is a schematic view showing a third embodiment of the ventilation system according to the present invention for use with a hog confinement building having roof mounted exhaust fans.

FIG. 10 shows a further embodiment of a ventilation system according to the present invention. The hog confinement buildings 10 of FIG. 10 has roof mounted fans 70 with conduits 72 extending downwardly through the slatted floor 22 and into the manure reservoir 24. The lower end of the conduit 72 includes spaced apart tracks or channels 74 for slidably receiving a floating gate 76. The lowering of the gate 76 includes a float 78 such that the gate 76 rises and falls with the level of the manure 62 in the reservoir 24. An opening 80 is provided in the lower end of the gate 76. The fan 70 creates an air flow in the building 10, wherein air is drawn downwardly from the confinement area 16, through the slatted floor 22, through the opening 80 adjacent the surface of the manure 62, and upwardly through the conduit 72 for expulsion from the building 10, as indicated by the arrows in FIG. 10.

In each of the embodiments of the ventilation system according to the present invention, the floating gate with the ventilation opening at the lower end causes air or gas in the reservoir to be pulled out at an elevation near the manure surface for expulsion by the fan. Thus, air turbulence immediately below the slatted floor is minimized so as to reduce or eliminate rising noxious gases through the slatted floor into the hog confinement area 16. Therefore, the ventilation system of the present invention produces better air quality in the hog confinement area, which produces healthier animals. The ventilation system of the present invention also reduces the air exchange rate in the confinement building 10 thereby minimizing energy costs for the air heating and cooling systems.

The invention has been shown and described above with the preferred embodiments, and it is understood that many modifications, substitutions, and additions may be made which are within the intended spirit and scope of the invention. For example, rather than having a floating door or gate, the door or gate can be raised and lowered by other mechanical and/or electrical means, such as a cable, pulley, winch or Linear actuator, which can be moved in response to the depth of the material in the pit. The gate movement can be automated, through the use of a sensor or other depth gauge. The gate movement can also be actuated manually or via a motor. The gate position can also be controlled using noxious gas sensors, or alternatively, may be varied based on the fan speed.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved ventilation system for a hog confinement building having a slatted floor, a manure reservoir beneath the floor, and a pump out pit in communication with the reservoir via an opening therebetween, the improvement comprising:
- a fan on top of the pit;
- an air conduit extending downwardly from the fan;
- a gate slidably mounted on the conduit for upward and downward movement along the conduit;
- the gate having a lower end with an air passage through which air from the pit is pulled into the conduit for expulsion by the fan; and
- the lower end of the gate including a float so that the gate floats on top of manure in the pit such that the air passage rises and falls as the depth of manure in the pit changes.

2. The improved ventilation system claim 1 wherein the air conduit and gate are retrofit into the pit.

3. The improved ventilation system of claim 1 wherein the gate has multiple detachable sections.

4. The improved ventilation system of claim 1 wherein the gate has an upper section and a lower section, with the air passage being in the lower section.

5. The improved ventilation system of claim 1 further comprising a cover on the pit with a slot in the cover through which the gate moves up and down.

6. The improved ventilation system of claim 1 wherein the conduit has spaced apart tracks in which the gate is mounted.

7. The improved ventilation system of claim 1 wherein the pit has a bottom, and the conduit has a lower end adjacent the bottom of the pit.

8. An improved ventilation system for a hog confinement building having a slatted floor, a manure reservoir beneath the floor, and a pump out pit in communication with the reservoir via an opening therebetween, the improvement comprising:
- a fan on top of the pit;
- a panel slidable mounted in the pit so as to block air flow from the reservoir to the fan;
- the panel having a lower end with an air passage through which air flows from the reservoir into the pit for expulsion by the fan; and
- a conduit extending downwardly from the fan in the pit, and the panel being slidably mounted on the conduit.

9. The improved ventilation system of claim 8 wherein the panel is adjacent the opening.

10. The improved ventilation system of claim 9 further comprising a pair of tracks on opposite sides of the opening, and the panel being slidably mounted in the tracks.

11. The improved ventilation system of claim 8 further comprising a float on the panel to engage an upper surface of manure in the pit, such that the panel floats on the manure surface.

12. The improved ventilation system of claim 8 wherein the panel has multiple detachable sections.

13. The improved ventilation system of claim 8 wherein the panel has an upper section and a lower section, with the air passage being in the lower section.

14. The improved ventilation system of claim 8 further comprising a cover on the pit with a slot in the cover through which the panel moves up and down.

15. A hog confinement building, comprising:
- a roof;
- a slatted floor;
- a manure reservoir beneath the floor for receiving manure through the slatted floor;
- a conduit having a lower end with an air passage residing at an elevation lower than the floor and an upper end;
- the conduit including a sliding panel which floats on top of the manure, and the air passage being formed in the panel; and
- a fan connected to the upper end of the conduit to pull air from a level adjacent the manure in the pit, through the air passage and upwardly through the conduit for expulsion from the conduit.

16. The hog confinement building claim 15 wherein the conduit extends into the reservoir.

17. The hog confinement building of claim 16 wherein the fan is on top of the roof.

18. The hog confinement building of claim 15 wherein the conduit is in a pump out pit.

19. An improved ventilation system for a hog confinement building having a slatted floor, a manure reservoir beneath the floor, and a pump out pit in communication with the reservoir via an opening therebetween, the improvement comprising:
- a fan on top of the pit;
- a panel slidable mounted in the pit so as to block air flow from the reservoir to the fan;
- the panel having a lower end with an air passage through which air flows from the reservoir into the pit for expulsion by the fan; and
- a float on the panel to engage an upper surface of manure in the pit, such that the panel floats on the manure surface.

20. The improved vent system of claim 19 further comprising a conduit extending downwardly from the fan in the pit, and the panel being slidably mounted on the conduit.

21. The improved ventilation system of claim 19 wherein the panel has multiple detachable sections.

22. The improved ventilation system of claim 19 wherein the panel has an upper section and a lower section, with the air passage being in the lower section.

23. The improved ventilation system of claim 19 further comprising a cover on the pit with a slot in the cover through which the panel moves up and down.

24. An improved ventilation system for a hog confinement building having a slatted floor, a manure reservoir beneath the floor, and a pump out pit in communication with the reservoir via an opening therebetween, the improvement comprising:
- a fan on top of the pit;
- a panel slidable mounted in the pit so as to block air flow from the reservoir to the fan;
- the panel having a lower end with an air passage through which air flows from the reservoir into the pit for expulsion by the fan; and
- a cover on the pit with a slot in the cover through which the panel moves up and down.

25. The improved vent system of claim 24 further comprising a conduit extending downwardly from the fan in the pit, and the panel being slidably mounted on the conduit.

26. The improved ventilation system of claim 24 further comprising a float on the panel to engage an upper surface of manure in the pit, such that the panel floats on the manure surface.

27. The improved ventilation system of claim 24 wherein the panel has multiple detachable sections.

28. The improved ventilation system of claim 24 wherein the panel has an upper section and a lower section, with the air passage being in the lower section.

* * * * *